United States Patent Office 2,772,961
Patented Dec. 4, 1956

2,772,961

METHOD OF SMELTING

Claude A. Seger, Cobalt, Ontario, Canada, and Philip B. Dettmer, Oakland, Calif., assignors to Quebec Metallurgical Industries Limited, Ottawa, Ontario, Canada, a Canadian company No Drawing. Application May 16, 1955,
Serial No. 508,822

10 Claims. (Cl. 75—82)

This invention relates to smelting finely divided metal compounds, such as the hydroxide, oxide or carbonate, to recover the metal. It relates especially to smelting the hydroxide, oxide or carbonate of nickel or cobalt. More particularly, the invention relates to smelting compounds of this type which are derived by precipitation from an aqueous solution with or without subsequent calcination.

Smelting compounds of this type on a commercial scale to recover the metal economically has presented difficult problems. This is illustrated by the failure of the recent attempts to smelt the pure nickel oxide obtained by treatment of the Nicaro ore in Cuba. The Review of the Nicaro Nickel Project, Plancor 690, distributed by the Office of the Publication Board, Department of Commerce, Washington, D. C., states that the original estimated cost of smelting this nickel oxide was 1.32 cents per pound of nickel but the actual cost was 23.43 cents per pound.

As stated in the above publication, the Nicaro ore in finely divided form was heated and contacted with a reducing gas which reduced the nickel and cobalt to metal and the iron to magnetic oxide. The reduced ore was cooled and agitated with a solution of ammonia and ammonium carbonate. After boiling off the ammonia, the nickel and cobalt were precipitated as basic carbonate which was calcined. The resulting pure oxide was mixed with the required amount of coal for reduction and with lime and molasses and the mixture was briquetted. These briquettes were fed into an electric furnace of the type usually used for melting metals. The briquettes would burst when heated and the dust and slag losses were excessive. After unsuccessful attempts to smelt this oxide over a period of several months, the smelting operation was abandoned without solution of the problems involved.

The present invention provides a novel method for smelting compounds of the above type which overcomes the difficulties previously encountered and by which such compounds may be smelted and the resulting metal refined in a single furnace operation.

In accordance with the present invention small tightly compressed briquettes of the finely divided metal compound to be reduced are formed. Good results have been obtained by forming small briquettes of pillow-like shape with a standard roll press such as is commonly used in the coal industry. If desired, the finely divided metal compound may be mixed with a binder, such as starch, molasses, flour or dextrin, before briquetting. The size of the briquettes is not critical but we prefer briquettes having a maximum dimension of from ¾ to 3 inches. The briquettes should not contain slag-forming constituents, such as lime, silica or the like, and should contain no reductant other than that incidental to the presence of a binder, if used. The metal compound should be of high purity as illustrated by a cobalt hydroxide obtained by precipitation from an aqueous solution of cobalt and nickel salts.

Any conventional furnace for melting metals may be used in the smelting and refining operations. Good results have been obtained using an electric arc melting furnace. A hood may be provided over the top of the furnace which communicates with a baghouse for collecting the small amount of dust escaping from the furnace during the reducing operation.

In the practice of the invention, a bath of molten metal is formed in the bottom of the furnace. When an electric arc furnace is used, the electrodes are maintained slightly out of contact with the molten metal to produce an electric arc therebetween to supply the heat for maintaining the metal molten. A carbonaceous reductant is introduced periodically upon the molten bath in small amounts to maintain the metal highly carburized. In order to avoid the introduction of impurities, the reductant should be a high purity form of carbon, such as charcoal. The size of the pieces of reductant is not important except that fines should be avoided to prevent dusting. A size range of plus ½ inch minus 3 inches is recommended. The briquettes of the metal compound to be reduced are introduced periodically upon the molten bath in small amounts so that only a thin layer of the mixture of reductant and briquettes is maintained floating upon the molten bath. By controlling the amount of briquettes introduced in this manner, the metal compound is maintained in an unfused condition and is reduced to metal by the carbon in the molten bath. Thus, the metal compound on the surface of the briquette is reduced to metal and the metal thus formed is dissolved by the molten bath. This reoccurs until the whole briquette disappears. As the briquettes disappear they are replaced by additional briquettes and additional reductant is introduced from time to time to maintain the carbon content of the molten metal high during the entire smelting operation. When an electric arc furnace is used, the blast of the arc forces the thin floating layer of reductant and briquettes away and maintains an open pool of molten metal around the arc. The atmosphere within the furnace above the molten metal should be maintained slightly reducing.

It is important to avoid fusion of the metal compound being reduced. It will be noted that the molten metal dissolves the carbon and becomes saturated. This dissolved carbon is removed by the decarburizing effect of the addition of the metal compound in compacted form. It has been found that the carburizing reaction of the carbon and the decarburizing effect of the metal compound take place simultaneously. The amount of charcoal used is not critical except that extreme caution must be maintained to assure that there is always an excess of charcoal or other form of pure carbon during the reduction phase of the operation, otherwise the metal compound will fuse into a non-reducible crust which must be removed from the furnace. The charcoal and metal compound are fed into the furnace at such a rate that a single layer of the mixture is maintained at all times during the reduction phase of the operation. If a deeper charge bed is maintained the danger of segregation occurs with subsequent fusing of the metal compound.

When substantially the desired amount of metal has accumulated in the bottom of the furnace, the introduction of reductant and briquettes as above described is discontinued. The carbon content of the metal then may be oxidized to practically nil content by the careful addition of briquettes of the metal compound to be reduced.

Any other impurities which may be present, such as sulfur or phosphorus, can be removed by conventional means. A particularly satisfactory procedure for this purpose comprises forming a basic slag cover on the molten metal by the addition of fluxes, such as limestone and fluorspar or silica. The desulphurizing is accelerated by the addition of aluminum in the form of rods thrust into the molten metal. The metal is "poled" or agitated with green wooden poles to bring all of the molten metal in contact with the aluminum and slag. The slag, containing a portion of the sulfur, is frozen by further additions of limestone in order to facilitate removal of the slag from the furnace. A new slag then is formed and the desulphurizing step is repeated. This procedure is repeated until the desired sulfur content is obtained. Heating of the furnace is maintained during this refining phase as required.

While the invention is particularly applicable for the recovery of nickel or cobalt from their finely divided hydroxides, oxides, or carbonates, it is believed applicable also for recovery of other metals from similar compounds if the metal is capable of dissolving a substantial amount of carbon when molten.

The invention is illustrated further by the following specific example of the reduction of cobalt hydrate. In this example the furnace used was a regular size "T" tilting, Pittsburgh Lectromelt, three phase, 150 kva. electric arc melting furnace having a low-iron basic refractory lining and a high alumina roof. A hood was provided over the top of the furnace which communicated with a baghouse for collecting dust escaping from the furnace during the reducing operation.

A molten pool of 153 lbs. of cobalt metal was formed in the bottom of the furnace. About 10 lbs. of briquettes of a size 1¼" x 1¼" x ¾" thick together with about 1 lb. of charcoal of a size ¼ inch up to 4 inches were introduced periodically every 3 to 5 minutes until the desired amount of metal had accumulated in the furnace. The total weight of briquettes and charcoal was 725 lbs. and 89 lbs. respectively. The metal was then decarburized by the careful addition of briquettes. This required 27 lbs. of the briquettes.

40 lbs. of limestone and 4 lbs. of fluorspar were added and melted on the molten bath to provide a basic slag. 1 lb. of aluminum in the form of rods 120 inches long and ½ inch in diameter were thrust through the slag into the molten metal. The molten burden was then "poled" or agitated with green wooden poles twice at ten minute intervals for about one minute each time to bring all the molten metal into contact with the aluminum and slag. The slag then was frozen by the addition of 5 lbs. of limestone and removed from the furnace. This procedure was repeated 4 times and the molten metal tapped from the furnace. The metal weighed 495 lbs. and had the following composition:

| | Percent |
|---|---|
| Cobalt | 98.6 |
| Iron | 0.38 |
| Nickel | 0.46 |
| Copper | 0.032 |
| Sulphur | 0.043 |
| Carbon | 0.07 |
| Phosphorus | 0.004 |
| Silicon | 0.02 |
| Others | Balance |

We claim:

1. The method of smelting a finely divided metal compound selected from the group consisting of the hydroxide, oxide, carbonate and mixtures thereof of a metal selected from the group consisting of cobalt and nickel which comprises forming small tightly compressed briquettes of said compound substantially free of slag-forming constituents, forming and maintaining a molten bath consisting essentially of the selected metal in the bottom of a furnace, periodically introducing a carbonaceous reductant upon the molten bath to maintain the metal highly carburized, periodically introducing said briquettes upon the molten bath in amounts to permit said briquettes and reductant to float in a thin layer on said bath and maintain said compound in an unfused condition and be reduced to metal and the latter to be dissolved in the molten bath, discontinuing said introduction of the reductant and briquettes when substantially the desired amount of metal has accumulated in the bottom of the furnace, and thereafter introducing additional briquettes on the bath in amounts such as to cause said compound to be reduced to metal by the residual carbon in the molten metal without fusing said compound and thereby lower the carbon content of the molten metal to a desired amount.

2. The method as claimed by claim 1 wherein the reductant is charcoal.

3. The method as claimed by claim 1 wherein the selected metal is nickel.

4. The method as claimed by claim 1 wherein the selected metal compound is cobalt hydroxide.

5. The method as claimed by claim 4 wherein the reductant is charcoal.

6. The method of smelting a finely divided metal compound selected from the group consisting of the hydroxide, oxide, carbonate and mixtures thereof of a metal selected from the group consisting of cobalt and nickel which comprises forming small tightly compressed briquettes of said compound substantially free of slag-forming constituents, forming and maintaining a molten bath consisting essentially of the selected metal in the bottom of an electric arc furnace having a plurality of electrodes, maintaining each of said electrodes slightly out of contact with the molten bath to form an arc therebetween, periodically introducing a carbonaceous reductant upon the molten bath to maintain the metal highly carburized, periodically introducing said briquettes upon the molten bath, controlling the amounts of said reductant and briquettes so introduced to permit the same to float in a thin layer upon the bath out of contact with an electric arc and maintain said compound in an unfused condition and be reduced to metal and the latter to be dissolved in the molten bath, discontinuing said introduction of the reductant and briquettes when substantially the desired amount of metal has accumulated in the bottom of the furnace, and thereafter introducing additional briquettes on the bath in amounts such as to cause said compound to be reduced to metal by the residual carbon in the molten metal without fusing said compound and thereby lower the carbon content of the molten metal to a desired amount.

7. The method as claimed by claim 6 wherein the reductant is charcoal.

8. The method as claimed by claim 6 wherein the selected metal is nickel.

9. The method as claimed by claim 6 wherein the selected metal compound is cobalt hydroxide.

10. The method as claimed by claim 9 wherein the reductant is charcoal.

References Cited in the file of this patent

UNITED STATES PATENTS

| 1,691,272 | Flodin | Nov. 13, 1928 |
| 1,819,238 | Greene | Aug. 18, 1931 |
| 1,920,377 | Greene | Aug. 1, 1933 |